United States Patent [19]

Taniguti et al.

[11] 4,253,089
[45] Feb. 24, 1981

[54] SIGNAL TRANSMISSION DEVICE FOR ELECTRIC ROTARY MACHINE

[75] Inventors: Ryosuke Taniguti; Naoto Ishibashi; Junichi Miyaji; Yosaburo Ichinose, all of Nagasaki, Japan

[73] Assignee: Mitsubishi Denki Kabushiki Kaisha, Tokyo, Japan

[21] Appl. No.: 936,504

[22] Filed: Aug. 24, 1978

[30] Foreign Application Priority Data

Sep. 1, 1977 [JP] Japan .................. 52/105503

[51] Int. Cl.³ .................. C08C 19/06; C08C 19/16
[52] U.S. Cl. .................. 340/870.31; 340/870.32; 340/870.19
[58] Field of Search .................. 340/189 M, 203, 205, 340/206, 195, 198, 196, 177 R, 204; 318/690, 691, 692, 653, 654; 323/51

[56] References Cited

U.S. PATENT DOCUMENTS

| 2,921,289 | 1/1960 | Eklund et al. ............ 340/189 M |
| 3,032,751 | 5/1962 | Hart .................... 340/198 |
| 3,303,701 | 2/1967 | Matsuura et al. ........... 340/195 |
| 3,530,449 | 9/1970 | Andersen ................ 340/206 |
| 3,641,535 | 2/1972 | Knopf ................... 340/195 |
| 3,863,235 | 1/1975 | McKee et al. ............ 340/195 |

FOREIGN PATENT DOCUMENTS

| 2652122 | 5/1978 | Fed. Rep. of Germany ...... 340/189 M |
| 4110767 | 6/1966 | Japan . |
| 4523449 | 8/1970 | Japan . |

Primary Examiner—James J. Groody
Attorney, Agent, or Firm—Wenderoth, Lind & Ponack

[57] ABSTRACT

The rotor of an electric rotary machine is provided with two identical transmitting devices each including an amplitude modulator and a transmitting antenna. One of the modulators modulates a carrier with clock pulses while the other modulator modulates the same carrier with a data signal from the rotor expressed by a binary digital code including pulses identical in both shape and phase to the clock pulses. The transmitting antennas are disposed symmetrically with respect to a receiving antenna located externally of the rotor to induce the two modulated carriers substantially in phase across the receiving antenna.

4 Claims, 2 Drawing Figures

SIGNAL TRANSMISSION DEVICE FOR ELECTRIC ROTARY MACHINE

BACKGROUND OF THE INVENTION

This invention relates to a signal transmission device for converting a physical quantity developed within the rotor of an electric rotary machine such as an AC generator or an AC motor to an electrical signal and transmitting it to the stationary side of the machine in a contact-less manner.

In the signal transmition such as above described, the transmitting antenna disposed on the rotor is of the electromagnetic induction type and the receiving antenna disposed on the stator is in the form of a loop of the electromagnetic induction type disposed to have a sufficient electromagnetic coupling to the electromagnetic induction type transmitting antenna at any angular position of rotation of the rotor. Then it is a common practice to transmit a plurality of types of signals according to either a frequency division system using different carrier waves or subcarrier waves different from one another and forming a common carrier wave or to a time sharing system using a single carrier wave. When the plurality of types of the signal are expressed by respective digital codes each put in the form of serial bits and transmitted in the time sharing manner to the stator, it is necessary to use only a single transmitting device.

However, in order to easily obtain excellent dynamic balance in rotors it is desirable to form the transmitting device of a pair of units identical in construction to each other. On the other hand, in case of the transmission of digital signals in the form of serial bits, is it necessary to transmit a frame or a word synchronizing signal for each digital signal. The transmission of this synchronizing signal along a channel different that of the digital signal in many cases permits the simplification of the resulting device. There have not been any previously proposed signal transmission devices optimum for meeting the requirements as described above.

Accordingly, it is an object of the present invention to provide a new and improved signal transmission device for transmitting a data signal representing, for example, the field voltage, the current etc. of the rotor of an electric rotary machine externally of the rotor while the rotor is rotated.

SUMMARY OF THE INVENTION

The present invention provides a signal transmission device comprising a transmitting position where signals to be transmitted are produced, a receiving position for receiving the signals, a first transmitting means at the transmitting position for modulating a carrier wave with a first signal represented by a digital code and transmitting the modulated carrier to the receiving position through a first transmitting antenna, a second transmitting means at the transmitting position for modulating the carrier wave with a second signal represented by a digital code having the same clock pulses as the first mentioned digital code and transmitting the carrier wave thus modulated to the receiving position through a second transmitting antenna, and means for setting the phase difference between the modulated carrier waves from the first and second transmitting means at the receiving position to a magnitude within predetermined limits.

BRIEF DESCRIPTION OF THE DRAWING

The present invention will become more readily apparent from the following detailed description taken in conjunction with the accompanying drawings in which.

DESCRIPTION OF THE PREFERRED EMBODIMENT

Figure 1:
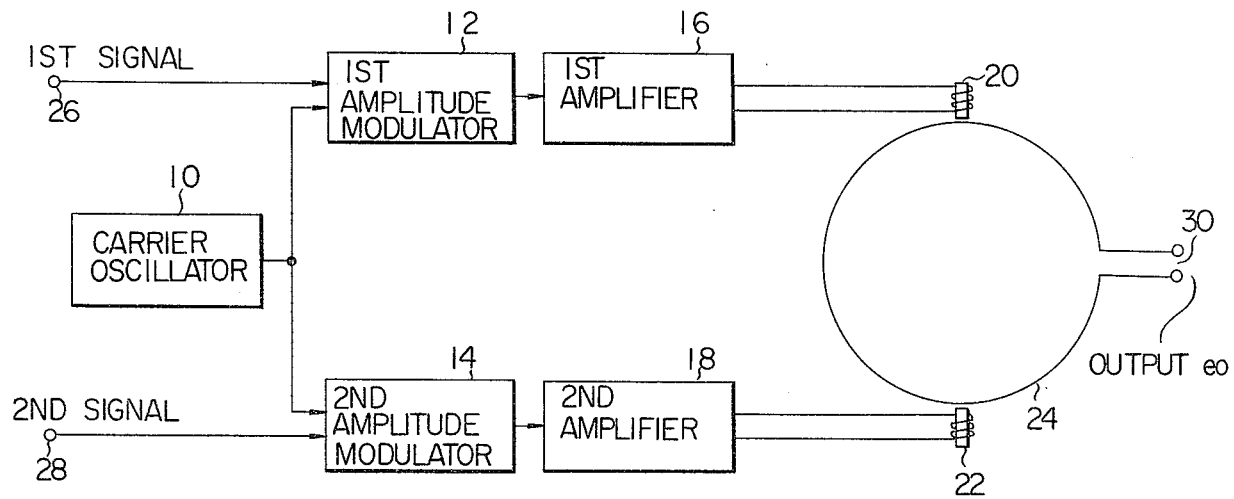
FIG. 1 is a block diagram of one embodiment according to the signal transmission device of the present invention.

Referring now to FIG. 1 of the drawing, there is illustrated a signal transmission device for an electric rotary machine constructed in accordance with the present invention. The arrangement illustrated comprises a carrier oscillator 10 for generating a carrier wave at an oscillation frequency of, for example, 100 kilohertzs, a pair of first and second amplitude modulators 12 and 14 connected to the carrier oscillator 10, and a pair of first and second amplifiers 16 and 18 connected to the first and second amplitude modulators 12 and 14 respectively. The first and second amplifiers 16 and 18 are then connected to a pair of first and second transmitting antennas of the electromagnetic induction type 20 and 22 respectively which are, in turn, electromagnetically coupled to a receiving antenna 24 shown as being in the form of a circular loop. Both transmitting antennas 20 and 22 are disposed symmetrically with respect to the receiving antenna 24. That is, the first and second transmitting antennas 20 and 22 are disposed on the rotor of the electric rotary machine to be symmetrical with respect to the longitudinal axis thereof.

The first amplitude modulator 12 is also connected to a first input terminal 26 to which a first signal, in this case, a synchronizing signal of, for example, one kilohertz is applied, and the second amplitude modulator 14 is also connected to a second input terminal 28 having applied thereto a second signal, in this case, a data signal representing a physical quantity such as the field voltage or the current measured within the rotor of the electric rotary machine (not shown). The receiving antenna 24 includes a pair of output terminals 30.

The first amplitude modulator 12, the first amplifier 16 and the first antenna 20 form a first transmitting means while the second amplitude modulator 14, the second amplifier 18 and the second antenna 22 form a second transmitting means. Both transmitting means are disposed on the rotor of the electric rotary machine (not shown) along with the carrier oscillator 10 and the receiving antenna 24 is disposed externally of the rotor.

In operation, the first amplitude modulator 12 modulates the carrier wave from the carrier oscillator 10 having a predetermined constant frequency, for example, 100 kilohertzs with the first signal applied thereto through the first input terminal 26. The first signal is in the form of a train of square clock pulses having a predetermined pulse repetition frequency, for example, one kilohertz as shown by waveform (a) in FIG. 2, and the first amplitude modulator 12 supplies to the first amplifier 16 an amplitude modulated carrier wave as shown by waveform (c) in FIG. 2. On the other hand, the second amplutude modulator 14 modulates the carrier wave from the oscillator 10 with the second signal in the form of serial pulses (see FIG. 2, waveform (b)) applied thereto through the second input terminal 28 and supplies an amplitude modulated carrier wave (see FIG. 2, waveform (d)) to the second amplifier 18. From waveforms (a) and (b) it is seen that the pulses forming the second signal are identical in both shape and phase to the clock pulses. After having been amplified by the respective amplifiers 16 and 18, both modultaed carrier waves are applied through the individual transmitting antennas 20 and 22 to the receiving antenna 24 and a voltage as shwon by waveform (e) in FIG. 2 is developed across the output terminals 30.

Thereafter the output waveform (e) is separated into the original waveforms (a) and (b) in a manner well known in the art resulting in the reporduction of the second signal. The separation of the waveform (e) and the reproduction of the second signal forms no part of the present invention and therefore need not be further described.

Figure 2:
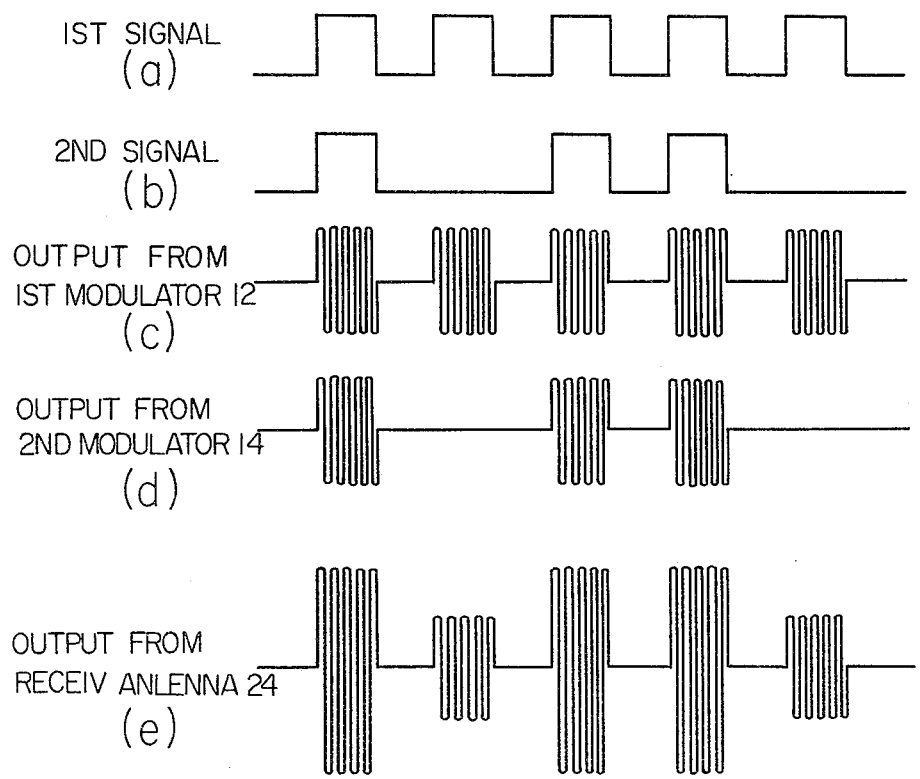
FIG. 2 is a graph illustrating voltgae waveforms developed at various point in the arrangement shown in FIG. 1.

Also in FIG. 2, the modulated carrier wave induced in the receiving antenna 24 through the first transmitting antenna 20 is substantially identical in phase to that induced in the antenna 24 through the second transmitting antenna 22. Therefore the waveform (e) has its amplitude equal to the sum of amplitudes of the waveform (c) and the waveform (d).

When the first transmitting means formed of first amplitude modulator 12, amplifier 16 and transmitting antenna, is substantially identical in construction to the second transmitting means formed of the second amplitude modulator 14, amplifier 18 and transmitting antenna 22 and both transmitting antennas 20 and 22 are disposed substantially symmetrically with respect to the receiving antenna 24 as in the arrangement of FIG. 1, the carrier wave from the first transmitting means has substantially the same phase as that from the second transmitting means on the receiving antenna 24.

From the foregoing it is seen that the present invention comprises a pair of transmitting means for respectively modulating a common carrier wave with a pair of different signals and utilizes the fact that the modulated carrier waves coincide in phase with each other on the receiving side. This results in several advantages. For example, only a single receiver with an associated receiving antenna is required. The use of a pair of transmitting means disposed in diametrically opposed relationship on the particular rotor permits the rotor to be put in an excellent balance state. Also it is possible to make the entire construction simple and small-sized.

While the present invention has been illustrated and described in conjunction with a single preferred embodiment thereof it is to be understood that numerous changes and modifications may be resorted to without departing from the spirit and scope of the present invention. For example, while the present invention has been described in terms of the first and second signals formed of the synchronizing and data signals respectively, it is needless to said that the same is equally applicable to any pair of signals different different in type from each other. In this case either one of those signals may form the first signal while the remaining signal forms the second signal. Also the arrangement of FIG. 1 may be used to transmit command signals to the rotor of a electric rotary machine with the transmitting means disposed on the stator of the rotary machine and with the receiving antenna disposed on the rotor thereof. Further the present invention is equally applicable to rotary machines other than electric machines and the transmission of signals from one to the other of stationary positions.

What we claim is:

1. A signal tranmission device for transmission of first and second digital code signals encoded with respect to the same clock signal in an electric rotary machine, said signal transmission device comprising:
    a receiving means, disposed on said electric rotary machine, having a circular loop type receiving antenna; and
    a transmitting means, disposed on said electric rotary machine, said receiving means and said transmitting means being relatively rotatable, said transmitting means having a carrier oscillator means for generating a carrier wave, a first transmitting means including a first modulator having said first digital code signal and said carrier wave applied thereto for modulating said carrier wave with said first digital code signal and a first tranmsmitting antenna connected to said first modulator for transmitting said first digital code signal modulated carrier wave, and a second transmitting means including a second modulator having said second digital code signal and said carrier wave applied thereto for modulating sadi carrier wave with said second digital code signal and a second transmitting antenna connected to said second modulator and disposed diametrically opposite said first transmitting antenna with respect to said circular loop type receiving antenna for transmitting said second digital code modulated carrier wave.

2. A signal transmission device for an electric rotary machine as claimed in claim 1 wherein said transmitting means lies within the rotor of an electric rotary machine and said receiving means lies externally of said rotor.

3. A signal transmission device for an electric rotary machine as claimed in claim 2 wherein said first and second transmitting are disposed on said rotor symmetrically with respect to the longitudinal axis thereof.

4. A signal transmission device for an electric rotary machine as claimed in claim 2 wherein said first digital-code signal forms a synchronizing signal for the transmission of said second digital-code signal and said second digital-code signal forms a data signal measured within said rotor.

* * * * *